(12) United States Patent
Elsmark et al.

(10) Patent No.: US 8,696,265 B2
(45) Date of Patent: Apr. 15, 2014

(54) PORTABLE POWER DRILL WITH DRILLING IMPLEMENT ROTATING AND FEEDING MEANS

(75) Inventors: Karl Johan Lars Elsmark, Saltsjo-Boo (SE); Lars Peter Johan Kjellqvist, Molnbo (SE)

(73) Assignee: Atlas Copco Industrial Technique Aktiebolag, Stockholm (SE)

( * ) Notice: Subject to any disclaimer, the term of this patent is extended or adjusted under 35 U.S.C. 154(b) by 655 days.

(21) Appl. No.: 12/988,375

(22) PCT Filed: Apr. 8, 2009

(86) PCT No.: PCT/SE2009/000183
§ 371 (c)(1),
(2), (4) Date: Nov. 30, 2010

(87) PCT Pub. No.: WO2009/128759
PCT Pub. Date: Oct. 22, 2009

(65) Prior Publication Data
US 2011/0091295 A1    Apr. 21, 2011

(30) Foreign Application Priority Data
Apr. 18, 2008 (SE) ...................... 0800904

(51) Int. Cl.
*B23B 47/18* (2006.01)
(52) U.S. Cl.
USPC ............. 408/10; 408/101; 408/138; 408/139; 173/217
(58) Field of Classification Search
USPC ............. 408/8, 9, 10, 11, 101, 137, 138, 139; 173/152, 216, 217
See application file for complete search history.

(56) References Cited

U.S. PATENT DOCUMENTS

| 4,097,177 A | 6/1978 | Close | |
| 4,201,271 A * | 5/1980 | Evans | ........................ 173/146 |
| 4,591,299 A | 5/1986 | Eckman | |

(Continued)

FOREIGN PATENT DOCUMENTS

| DE | 198 58 669 A1 | 6/1999 |
| EP | 0 516 343 A1 | 12/1992 |

(Continued)

OTHER PUBLICATIONS

Extended European Search Report(EESR)dated Mar. 15, 2013 on English) in counterpart European Application No. 09732503.9.

(Continued)

*Primary Examiner* — Daniel Howell
*Assistant Examiner* — Michael Vitale
(74) *Attorney, Agent, or Firm* — Holtz, Holtz, Goodman & Chick, PC

(57) ABSTRACT

A portable power drill comprises a housing, a drilling implement carrying drive spindle, and two individually powered and controlled motors for rotating and axially feeding the drive spindle. The drive spindle is rotative and axially displaceable relative to the housing and connected to the drive and feed motors via angle gears including two bevel gears supported on the drive spindle. The feed via an axially locked but rotative nut piece and an external thread on the drive spindle, whereas the drive motor is drivingly connected to the drive spindle via longitudinal keyways on the drive spindle and mating splines in one of the bevel gears. The drive motor and the feed motor are electric motors controlled and monitored by a programmable control unit.

7 Claims, 1 Drawing Sheet

(56) References Cited

U.S. PATENT DOCUMENTS

| | | | | |
|---|---|---|---|---|
| 4,688,970 | A | * | 8/1987 | Eckman .................. 408/9 |
| 4,691,787 | A | * | 9/1987 | Akesaka .................. 173/145 |
| 4,854,786 | A | * | 8/1989 | Alexander et al. ......... 408/1 R |
| 4,911,588 | A | * | 3/1990 | Ikemoto et al. ............ 408/137 |
| 4,958,967 | A | | 9/1990 | Adachi |
| 5,054,968 | A | * | 10/1991 | Eckman .................. 408/97 |
| 5,205,681 | A | * | 4/1993 | Eckman .................. 408/1 R |
| 5,282,704 | A | | 2/1994 | Screen |
| 6,786,683 | B2 | | 9/2004 | Schaer et al. |
| 7,192,223 | B2 | * | 3/2007 | Chun et al. ............... 408/137 |
| 2004/0103510 | A1 | * | 6/2004 | Sauter et al. .............. 29/26 A |
| 2004/0115014 | A1 | * | 6/2004 | Totsu ..................... 408/199 |
| 2006/0018724 | A1 | * | 1/2006 | Oehninger et al. .......... 408/124 |
| 2006/0269369 | A1 | | 11/2006 | Fritsche et al. |

FOREIGN PATENT DOCUMENTS

| | | |
|---|---|---|
| EP | 1 249 290 A1 | 10/2002 |
| GB | 657310 A | 9/1951 |
| GB | 2 105 622 | 3/1983 |
| JP | 7-299656 A | 11/1995 |
| WO | WO 2006077340 A1 * 7/2006 ............. B23Q 17/09 |

OTHER PUBLICATIONS

International Search Report dated Mar. 7, 2009 issued in International Appln. No. PCT/SE2009/000183.

* cited by examiner

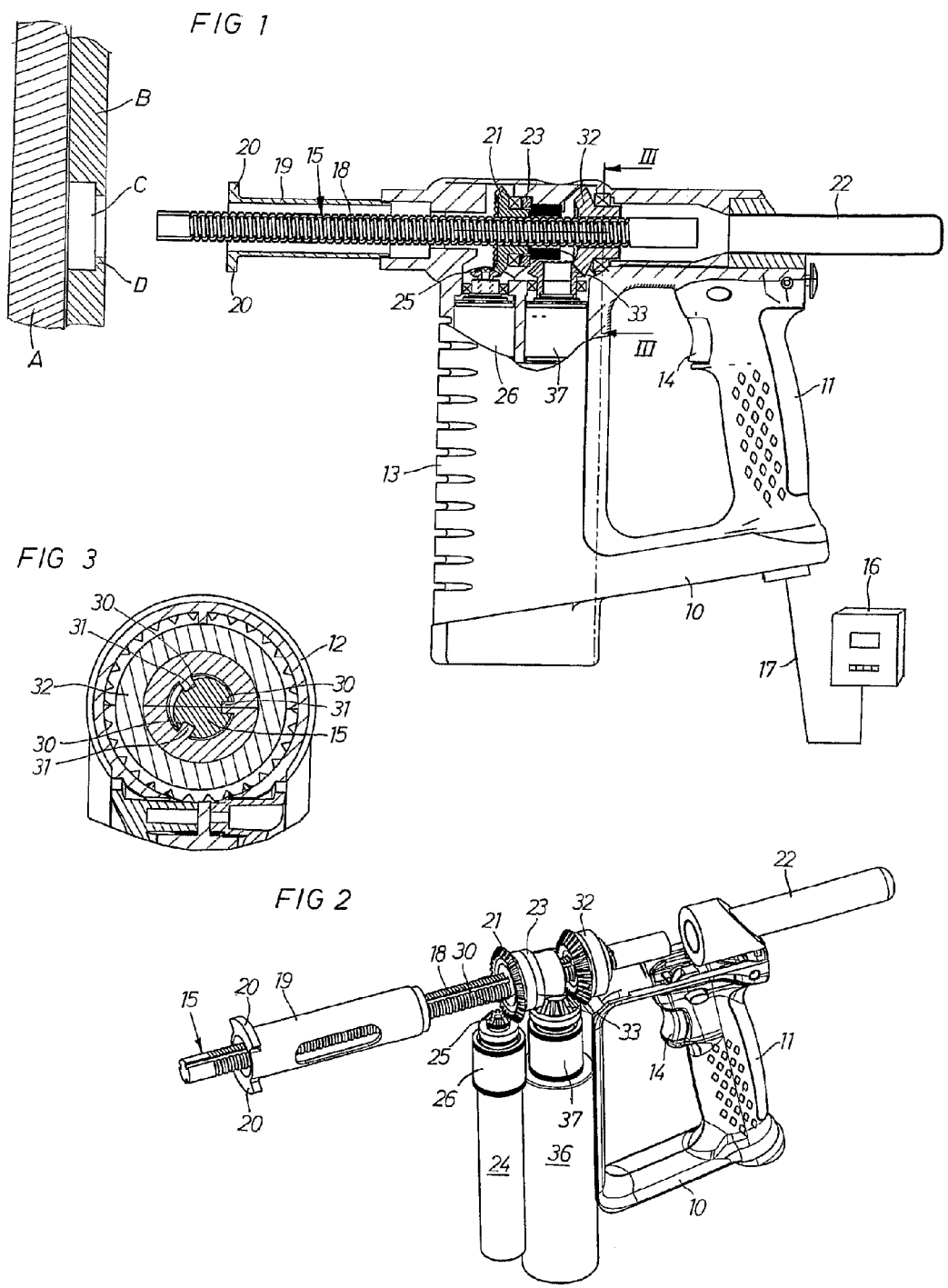

PORTABLE POWER DRILL WITH DRILLING IMPLEMENT ROTATING AND FEEDING MEANS

This application is a U.S. National Phase Application under 35 USC 371 of International Application PCT/SE2009/000183 filed Apr. 8, 2009.

The invention relates to a portable power drill with separate means for accomplishing rotation and feeding of the drilling implement during drilling operations.

In prior art technique power drills has been provided with fluid powered drive motors arranged not only to accomplish rotation but to impose an axial feed movement on the drive spindle via a specific gearing. This gearing comprises means for connecting the drive motor both to the drive spindle for rotating the latter and to a screw gearing to accomplish axial displacements of the drive spindle. A drawback with these known drills is that this gearing gives a non-variable feed rate which can not be change without dismantling the power drill and change components of that gearing. Accordingly, it is absolutely impossible to vary the feed rate during drilling, for instance to have different feed rates as the drilling implement penetrates layers of different material. In other words, it has not been possible to vary the drilling parameters during drilling, particularly the feed rate, to thereby optimize the time and energy spent on the drilling operation. For instance, the risk for rapid wear and/or damage both on the drilling implement and the worked object has been great in some applications due to a too high feed rate. On the other hand, a too long time has been spent on many drilling operations owing to a pre-set low "safety first" feed rate. The flexibility of the prior art devices has been poor.

A power drill of the above type is previously described in U.S. Pat. No. 3,797,583.

Another problem concerned with prior art power drills is that it has not been possible to monitor the drilling operations and to have indications whether performed operations have given acceptable results. Accordingly, it has not been possible to get information on the actual torque magnitude, feed force etc. indicating whether the drilling operation has been performed as intended, i.e. the quality of the drilling operations has not been possible to determine.

It is an object of the invention to provide an improved portable power drill wherein the drive spindle rotation and feed movement are performed separately and independently, such that drive spindle rotation and feed movements can be controlled and monitored separately thereby improving the flexibility of the power drill is substantially.

It is another object of the invention to provide a portable power drill with independent and separate drive spindle rotation and feed rate control, wherein an operation control and monitoring unit is arranged to momentarily control and monitor the drilling parameter values for drive spindle rotation and feed movement during drilling operations and to provide information on the quality of each performed operation.

Further objects and advantages of the invention will appear from the following specification and claims.

A preferred embodiment of the invention is described below in detail with reference to the accompanying drawing.

In the drawing

FIG. 1 shows a side view, partly in section, of a power drill according to the invention.

FIG. 2 shows a schematic view in perspective of the components of the power drill in FIG. 1.

FIG. 3 shows on a larger scale a cross section along line in FIG. 1.

The power drill illustrated in the drawing comprises a housing 10 with a rear handle 11, a drive spindle 15, and a motor casing 13 lodging a drive motor and feed motor as described below. The handle 11 carries a trigger 14 for maneuvering an on-off function and includes some non-illustrated electronic components for treating signals derived from a feed force and motor angle sensing means as described in further detail below. The electronic components in the handle 11 are connected to an extern operation control unit 16 via a cable 17.

The drive spindle 15 is rotative as well as longitudinally displaceable relative to the housing 10 and carries at its forward end a non-illustrated drilling implement of any commonly available type. The housing 10 is provided with a forwardly extending connection sleeve 19 which is rigidly secured to the housing 10 and formed at its forward end with lock flanges 20 to be connected to a matrix structure B. The latter is firmly secured to the object A to be drilled and is formed with apertures C in a desired pattern to accurately locate the power drill in correct positions for the holes to be drilled. Each aperture C is formed with flanges D mating with the flanges 20 of the connection sleeve 19 to form a bayonet-type lock and to transfer feeding force reactions from the power drill to the object being drilled. This is common technique and is not described in further detail. At its rear end the housing 10 is provided with a protective tubular hood 22 by which the drive spindle 15 is protected when in its rear end position.

The drive spindle 15 has a threaded portion 18 extending over the major part of its length for cooperation with a nut piece 21. The latter is formed by an internally threaded bevel gear which is rotative but axially immovable relative to the housing 10 and which is connected to a feed motor 24 via a pinion 25. The bevel gear/nut piece 21 and the pinion 25 form together a feed mechanism for accomplishing a longitudinal movement of the drive spindle 15. The feed motor 24, which accordingly is disposed in a right angle relative to the drive spindle 15, is preferably a brush-less electric motor provided with a reduction gearing 26 and a built-in angle sensor for producing electric signals in response to the angular position or movement of the feed motor 24. The feed motor 24 is supplied with power from the control and monitoring unit 16 and is arranged to rotate the bevel gear/nut piece 21 in either direction and/or at different speed magnitudes to accomplish desired feed movements of the drive spindle 15. That will be described below. Between the bevel gear/nut piece 21 and the housing 10 there is provided a force sensing device in the form of a load cell 23 by which a signal is obtained in response to the axial load or feeding force applied on the drive spindle 15.

Moreover, the drive spindle 15 is provided with four longitudinally extending grooves or keyways 30 disposed at 90 degrees angular intervals and intended to cooperate with corresponding splines 31 in a bevel gear 32. The latter is rotatably journalled in the housing 10 and is engaged by a pinion 33 powered by the drive motor 36. By the spline/keyway arrangement 30,31 the drive spindle 15 is able to be moved axially while rotatively locked to the bevel gear 32, which means that the drive motor 36 is able to apply a driving torque to the drive spindle 15 via the bevel gear 32 irrespective of axial position and/or movement of the drive spindle 15. The drive motor 36 which preferably is a brush-less electric motor includes a reduction gearing 37 and an angle sensor and is powered by the control unit 16 to accomplish a desired rotation speed of the drive spindle 15.

The above mentioned operation control unit 16 is a stationary unit located at working site and is connected to the power drill via the cable 17. The control unit 16 comprises a voltage converter by which the feed motor 24 and the drive motor 36 are supplied with electric power of variable voltage and frequency. The control unit 16 also comprises an electronic programmable operation control and monitoring means in which are stored one or more sets of drilling parameter values by which the drilling operations shall be performed to accomplish acceptable results when drilling in different materials. Each parameter set comprises parameter values for drive spindle rotation and feed speed suitable for drilling a particular material or a combination of two or more materials. The control unit is also programmed with limit values for the operation parameters, and a means for comparing received signals responsive to the actual angular positions and speed of the drive and feed motors, the feed force etc. with the stored limit values and to give indications as to whether the limit values have been overrun or not, i.e. whether the drilling operation has been performed in an acceptable way.

In operation, the power drill is connected to the control unit 16 via the cable 17 for receiving power according to a selected set of operation parameter values and for delivering back actual operation related signals. The drive spindle 15 is provided with a suitable drilling implement and the connection sleeve 19 is brought into a locking engagement with a drilling matrix aperture C. When the power drill is safely locked to the matrix B the trigger 14 is pulled by the operator and the drilling operation is started. The function of the feed mechanism is based on the cooperation between the nut piece 21 and the threaded portion 18 of the drive spindle 15.

For illustration purpose it is assumed that the feed motor 24 in a certain case is kept at stand still which means that the bevel gear/nut piece 21 does not rotate relative to the housing 10. Under this condition the feed movement of the drive spindle 15 is determined by the pitch of the drive spindle thread 18 only, i.e the feed velocity of the drive spindle 15 depends wholly on the rotation speed of the drive spindle 15. In other words, the feed rate (relationship between rotation speed and the feed velocity of the drive spindle 15) is determined solely by the pitch of the drive spindle thread.

In another illustration case the feed motor 24 is operated to rotate the bevel gear/nut piece 21 in the same direction and with the same speed as the drive spindle 15. Since in this case there is no relative rotation between the drive spindle 15 and the bevel gear/nut piece 21 there will be no longitudinal movement of the drive spindle 15 at all. Should instead the bevel gear/nut piece 21 be rotated in the same direction as the drive spindle 15 but at a lower speed there would be a feed movement in the forward direction of the drive spindle 15 at a reduced speed. If instead the feed motor 24 is operated to rotate the bevel gear/nut piece 21 at a speed higher than that of the drive spindle 15 there would be accomplished a reverse movement of the drive spindle 15, i.e. a retraction movement of the drive spindle 15 after a completed drilling operation. Consequently, a very fast feed movement of the drive spindle 15 could be obtained by reversing the feed motor 24 and rotating the bevel gear/nut piece 21 backwards.

Depending on the structure and material of the work piece A to be penetrated by drilling a suitable parameter set is chosen from those initially stored in the control unit 16. The material of work piece A could homogeneous, i.e. comprise just one single material with a non-changing properties throughout the work piece, which means that a parameter set with a certain drive spindle speed and a certain feed velocity is chosen suitable to give an optimum drilling operation, both regarding efficiency and acceptable result. The parameter set is also chosen with regard to the size of the hole to be drilled and the type drilling implement used.

Both of the feed motor 24 and the drive motor 36 are provided with angle encoders by which the rotational movements of the motors are accurately measured. The speed of the motors 24,36 are accurately determined by the control unit 16 by controlling the voltage and frequency magnitudes of the supplied power. This makes it possible to have the control unit 16 control the operation very accurately throughout the drilling process. By using the signals from the angle encoders of the drive and feed motors it is possible to continuously calculate the drive spindle positions and to make momentary changes in the parameter values of the supplied power. It is also possible to determine whether a drilling operation has been performed as expected by continuously analysing the torque momentarily applied during the operation in view of the momentary movement and/or position of the drive spindle as well as the axial feeding force applied on the drive spindle. The actual feeding force is indicated by the load cell 23. This gives in turn a possibility to make retrievable and to store the drilling data for each drilled hole for post drilling analysis of the result and quality of the performed drilling operation.

The crucial feature of the invention is the use of electric motors for drive spindle rotation as well as for feed movements, particularly brush-less motors fed with electric power of variable frequency and voltage magnitude according to programmed parameter sets, because that type of motors makes it possible to control the process momentarily and very accurately to compensate for instantaneous variations in feed and drive spindle resistance experienced during each drilling operation. For instance, torque peaks occurring at the initial contact between the drilling implement and the work piece as well as sudden torque drops at full penetration of the work piece are easily compensated by momentary adaptations of the power parameter values. The possibility to obtain very fast changing of power parameter values according to programmed parameter sets or to occurring changes in the ongoing drilling operation makes it possible also to adapt momentarily the drilling parameters to work pieces comprising two or more materials in a sandwich-type compositions so as to obtain accurate drilling data all the way through the work piece. The control unit 16 is programmed to keep the speed of the drive motor 36 constant by keeping the supplied frequency constant and momentarily adapt the output voltage to compensate for occurring changes in the torque resistance on the drilling implement.

So, by continuously monitoring the torque resistance and axial load on the drive spindle 15 the control unit 16 is able to detect the initial contact between the drilling implement and the work piece as well as the very moment when the drilling implement penetrates through the work piece at completed operation. This means that a reverse movement of the drive spindle may be automatically initiated, and since the control unit 16 also calculates continuously the axial position of the drive spindle 15 it is also possible to accomplish an automatic shut off of the drive and feed motors as the rear end position of the drive spindle 15 is reached during reverse movement of the latter.

The invention claimed is:

1. A portable power drill provided with a drilling implement rotating and feeding system, comprising:
   a housing;
   a drive motor;
   a rotative drive spindle axially displaceable relative to the housing for feeding movements;
   a drilling implement carried at a forward end of the drive spindle;

a coupling for transferring rotational movement from the drive motor to the drive spindle irrespective of an axial displacement of the drive spindle; and a feed mechanism for axially displacing the drive spindle; wherein the feed mechanism comprises:
- a threaded portion of the drive spindle;
- a nut piece rotative but axially immovable relative to the housing and arranged to cooperate with said threaded portion; and
- a feed motor drivingly coupled to said nut piece and arranged to selectively rotate said nut piece at different speed levels and/or directions to vary a feed rate of the drive spindle during drilling;

wherein the drive motor and the feed motor comprise electric motors;

wherein said coupling and said feed mechanism comprise angle gears;

wherein said nut piece comprises a bevel gear; and wherein the drive motor and the feed motor are each disposed at a right angle to the drive spindle, and are parallel and adjacent to each other along a longitudinal direction of the drive spindle.

2. The power drill according to claim 1, wherein an operation of the drive motor and an operation of the feed motor are continuously controlled by a programmable control unit so as to adapt a rotation direction and/or speed of the feed motor to thereby adapt the feed rate to operation parameters momentarily required at an actual drilling.

3. The power drill according to claim 2, wherein the drive motor and the feed motor are individually energized via said control unit in accordance with programmed operation parameter values.

4. The power drill according to claim 1, wherein a load sensing device is disposed between the nut piece and the housing and arranged to deliver a signal in response to an actual feeding force applied on the drive spindle.

5. The power drill according to claim 2, wherein the drive motor and the feed motor comprise brush-less motors, and wherein said control unit is arranged to supply power of variable voltage and frequency to the drive motor and the feed motor.

6. The power drill according to claim 2, wherein a load sensing device is disposed between the nut piece and the housing and arranged to deliver a signal in response to an actual feeding force applied on the drive spindle.

7. The power drill according to claim 3, wherein a load sensing device is disposed between the nut piece and the housing and arranged to deliver a signal in response to an actual feeding force applied on the drive spindle.

* * * * *